R. VOSE.
Car Spring.
No. 26,723.
Patented Jan. 3, 1860.
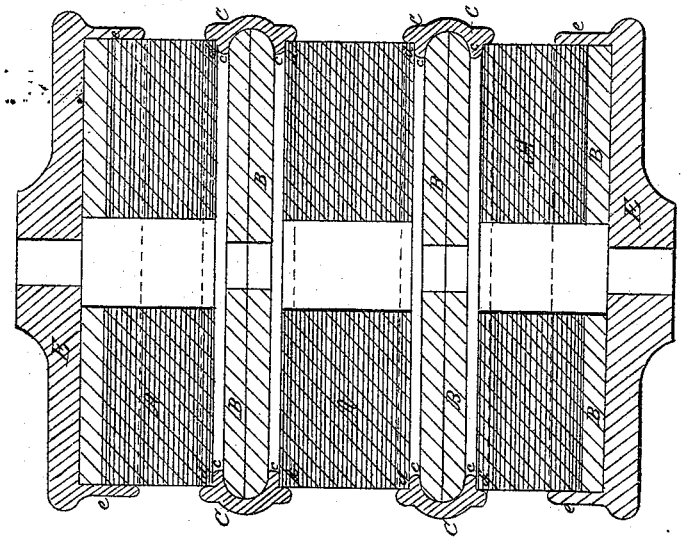
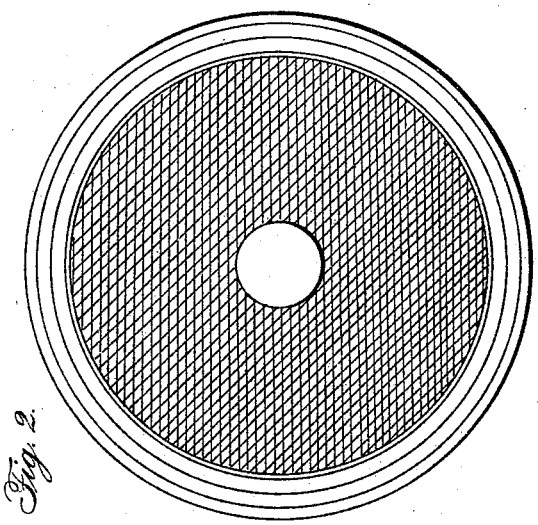
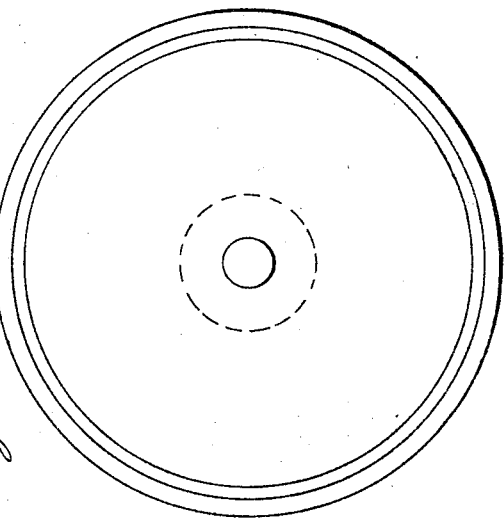
Witnesses:
Inventor:

UNITED STATES PATENT OFFICE.

RICHARD VOSE, OF NEW YORK, N. Y.

CAR-SPRING.

Specification forming part of Letters Patent No. 26,723, dated January 3, 1860; Reissued June 4, 1861, No. 1,194.

*To all whom it may concern:*

Be it known that I, RICHARD VOSE, of the city, county, and State of New York, have invented a new and useful Improvement in the manner of arranging india-rubber in connection with felt in metallic rings for the purpose of railroad-car springs, and that the following is a full and exact description thereof, reference being had to the accompanying drawings, making part of this specification.

In the drawings, Figure I, represents a vertical cross section through the center of the spring when complete. Fig. II, represents a single horizontal section through one of the rings and rubber placed therein. Fig. III, represents one of the rings in horizontal section.

In all the figures the same letters represent the same parts.

This improvement does not consists in using layers or plates in sections of india rubber, nor in the use of india rubber plates, and intermediate layers of felt combined and arranged so as to form a cylindrical shaped spring; these having been used for the purpose before; but my improvement and invention has reference chiefly to the manner of placing and securing the layers of felt and the layers of rubber within cast iron rings, the interior surfaces of which are grooved and shaped so as to secure the various layers and give them the required bearings suitable for a spring, and yet not too much compress or restrain the action of the rubber.

The form of the spring is cylindrical as shown in the drawings, Figs. I, II. The layers of india rubber are cut into disks of suitable thickness for the size and strength of spring required—the size represented in the drawing and model being a medium, and the rubber being about an inch and a half thick; between each of the layers of rubber are placed two layers of very thick felt.

In the drawings Fig. I, A, A, A, represent the layers of rubber; and B, B, B, the layers of felt; each single layer of felt being about one fourth the thickness of the layer of rubber. The layers of rubber and felt are arranged and secured in the cast iron rings, in a peculiar manner to which the rings are adapted.

The interior surface of the rings is made with a central groove running around the whole length as shown at C', C', (Fig. I); this groove is divided from the other parts of the interior surface by a lip c, on either side running around the ring; and the interior surface of the ring is again cut away from the exterior side of the lip, so as to form a rabbet for a bearing for the edges of the layers of rubber as seen at d, d. The top and base of the spring E, E, consist of a flat cast iron cup, the rims of which project far enough to cover a single layer of the felt, and also a small portion of the edge of the layer of rubber next to it, as shown at e, e. A bolt passes through the center to hold the parts together—the centers of the felt and rubber layers being cut out somewhat larger than the size of the bolt, to allow a play of the rubber toward the center.

The operation of the rings thus constructed is to hold the layers of felt in their places, and also to hold the rubber in its position; and to permit the rubber to have play at the center and in the exterior surfaces, while it is prevented from bursting and cracking on the edges by the rings and on the flat surfaces by the felt, which also keeps the rubber from having too much of its surface in contact with the metal.

It has been found that when layers of rubber have been placed together with plates of wood, metal, or other substance between them, without some protection upon the edges or peripheries, the rubber has a tendency to burst or crack, and when in contact with a large surface of iron, it rapidly deteriorates from rust. The construction of the rings above described, and the use of the felt as described, obviates these difficulties, and greatly improves and secures the spring.

I do not claim as my invention the use of disks or layers of rubber combined with felt, or other material; nor do I claim as my invention the confining or supporting the rubber by means of rings, metallic bands, or by cups at the top and base; these having been before known and used; but I confine my claim and allege my improvement to be, in making the metallic ring or circle with a central groove for the purpose of securing the felt firmly in its place when combined with the india rubber disks; that is to say, in the combination of the centrally grooved ring or circle with the layers of felt and rubber, arranged and operating together as described.

RICHD. VOSE.

Witnesses:
RICHARD WINNE,
GEO. W. FOX.